US008780279B2

(12) United States Patent
Chang et al.

(10) Patent No.: US 8,780,279 B2
(45) Date of Patent: Jul. 15, 2014

(54) TELEVISION AND CONTROL DEVICE HAVING A TOUCH UNIT AND METHOD FOR CONTROLLING THE TELEVISION USING THE CONTROL DEVICE

(71) Applicant: Hon Hai Precision Industry Co., Ltd., New Taipei (TW)

(72) Inventors: Chih-Chun Chang, New Taipei (TW); Chun-Hung Lai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/014,520

(22) Filed: Aug. 30, 2013

(65) Prior Publication Data

US 2014/0085540 A1    Mar. 27, 2014

(30) Foreign Application Priority Data

Sep. 26, 2012 (TW) .............................. 101135199 A

(51) Int. Cl.
*H04N 5/44* (2011.01)
*G06F 3/041* (2006.01)

(52) U.S. Cl.
USPC .......................................... 348/734; 345/173

(58) Field of Classification Search
USPC ............ 348/734, 569, 552; 340/12.54, 13.31; 725/37, 38; 345/156–158, 173–176
See application file for complete search history.

(56) References Cited

U.S. PATENT DOCUMENTS

| 5,545,857 | A  | * | 8/1996  | Lee et al. ................... 178/18.03 |
| 5,598,523 | A  | * | 1/1997  | Fujita ............................ 715/840 |
| 5,777,605 | A  | * | 7/1998  | Yoshinobu et al. ........... 345/173 |
| 6,407,779 | B1 | * | 6/2002  | Herz .............................. 348/734 |
| 6,750,803 | B2 | * | 6/2004  | Yates et al. .................... 341/176 |
| 6,765,557 | B1 | * | 7/2004  | Segal et al. .................... 345/173 |
| 7,966,568 | B2 | * | 6/2011  | Kim ............................... 715/764 |
| 2009/0051660 | A1 | * | 2/2009 | Feland, III et al. ........... 345/173 |
| 2010/0103097 | A1 | * | 4/2010 | Shiina ........................... 345/157 |
| 2011/0138336 | A1 | * | 6/2011 | Kim ............................... 715/848 |
| 2012/0117600 | A1 | * | 5/2012 | Friedlander et al. ............ 725/41 |

\* cited by examiner

*Primary Examiner* — Victor Kostak
(74) *Attorney, Agent, or Firm* — Novak Druce Connolly Bove + Quigg LLP

(57) ABSTRACT

A television is manipulated by a control device. The control device transmits position information mapped with a position on the control device in response to an operation. The television includes a screen to display a number of icons associated with a plurality of functions. Positions on the screen are mapped with positions on the control device correspondingly. A control method is applied to the television to cause the television to detect whether the position information is received from the control device; generate a cursor and calculate a position on the screen based on the position information; and display the cursor on the calculated position on the screen to select the icon located on the calculated position.

7 Claims, 7 Drawing Sheets

TELEVISION AND CONTROL DEVICE HAVING A TOUCH UNIT AND METHOD FOR CONTROLLING THE TELEVISION USING THE CONTROL DEVICE

BACKGROUND

1. Technical Field

The disclosure relates to televisions, and particularly to a control device and a method for interacting with a television.

2. Description of Related Art

A television not only plays television signals, but also provides special functions other than playing television signals. For example, the special functions may be a calendar function, a computing function, a game function, and so on. However, a user still operates the television by a typically remote device. The operation steps are often cumbersome and tedious for users.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
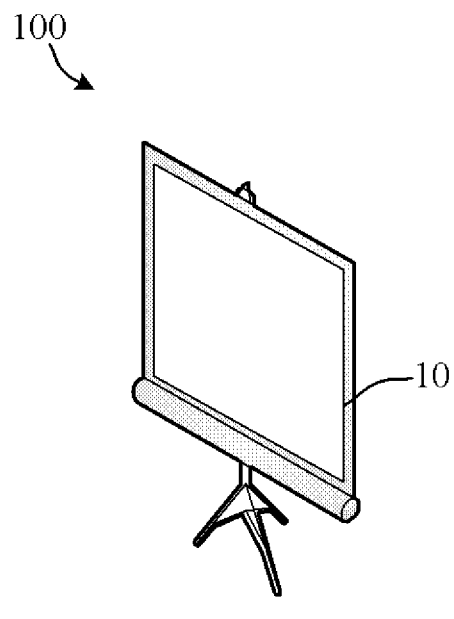
FIG. 1 is a functional block diagram of a television system in accordance with an embodiment, the electronic system including a television and control device.
Figure 1:
Figure 1:
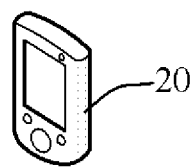

FIG. 1 shows a television system 100. The television system 100 includes a television 10 and a control device 20 for interacting with the television 10. The control device 20 communicates with the television 10 wirelessly via known wireless technologies, such as Bluetooth®, WIFI, and RF for example. The control device 20 senses operations of a user to generate control instructions to manipulate the television 10.

Figure 2:
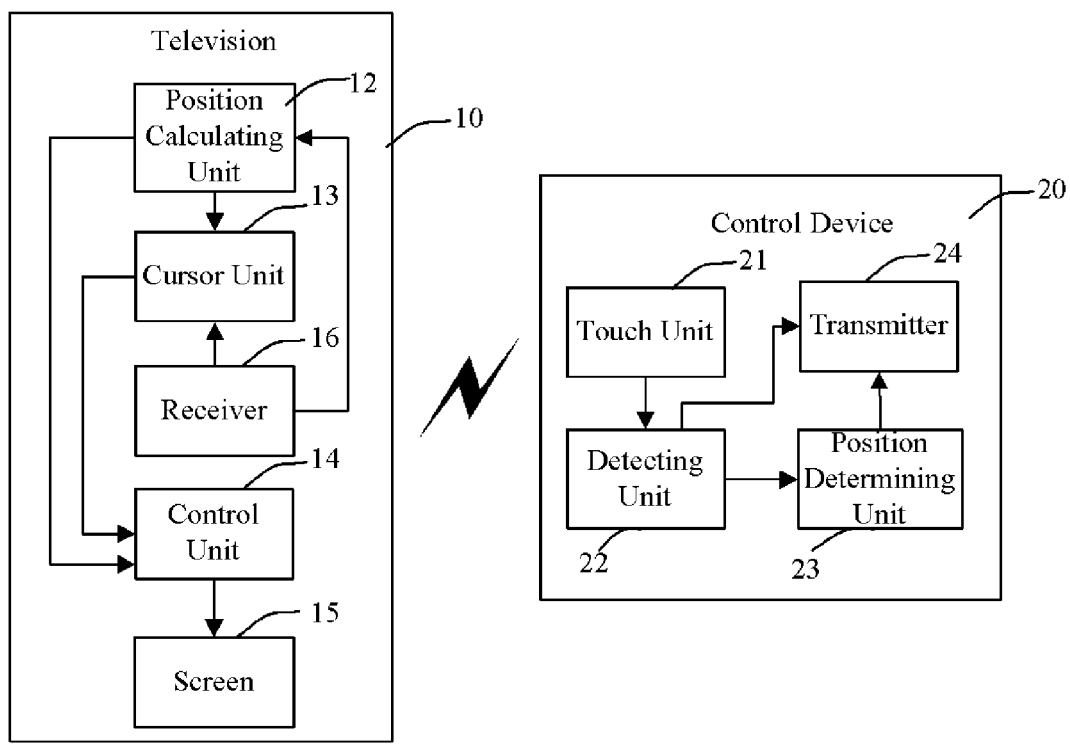
FIG. 2 is a functional block diagram of the control device and the television.

FIG. 2 shows functional blocks of the control device 20. The control device 20 includes a touch unit 21, a detecting unit 22, a position determining unit 23, and a transmitter 24.

The touch unit 21 may be a capacitive touch screen or a capacity touch panel for example. The touch unit 21 detects whether an object is within a predetermined distance from the touch unit 21, and generates a touching signal when the object is within the predetermined distance from the touch unit 21. The object may be a finger of a user, a stylus for example. In this embodiment, the predetermined distance is 5 cm. The touch signal becomes stronger when the object is closer to the touch unit 21, otherwise, the touching signal becomes weaker. Therefore, when the object contacts the touch unit 21, the touch signal is strongest.

The detecting unit 22 detects whether the touch signal is generated. The detecting unit 22 further transmits the touch signal to the position determining unit 23, and detects the intensity of the touch signal to generate intensity information when the touch signal is detected. The detecting unit 22 may include a number of instructions executed by a processor (not shown) of the control device 10 to cause the control device 10 to perform corresponding tasks.

The position determining unit 23 determines a position in which the object is pointed and generates position information based on the touch signal. The position information is coordinate of the touch unit 21. The detecting unit 23 may includes a number of instructions executed by the processor of the control device 10.

The transmitter 24 transmits the position information and the intensity information to the television 10 to manipulate the television 10. The transmitter 24 may be an infra-red (IR), a Bluetooth®, a WIFI, or a RF transmitter.

The television 10 includes a position calculating unit 12, a cursor unit 13, a control unit 14, a screen 15, and a receiver 16. The position calculating unit 12, the cursor unit 13, the control unit 14 may include a number of instructions executed by a processor (not shown) of the television 10 to cause the television 10 to perform corresponding tasks.

The receiver 16 receives the position information and the intensity information. The receiver 16 may be an IR, a Bluetooth, a WIFI, or a RF transmitter. receiver.

The screen 15 is larger than the touch unit 21. Positions on touch unit 21 are mapped with positions on the screen 15 correspondingly. The screen 15 display a number of icons (such as D1-D4 in FIGS. 5-7) associated with a number of functions. The icons are activated to call the associated functions. The screen 15 may be a LCD panel, a LED panel for example.

The position calculating unit 12 detects whether the position information is received. When the position information is received, the position calculating unit 12 further calculates a position on the screen 15 associated with the position information based on the position information and a predetermined position relationship between the screen 15 and the touch unit 21

The cursor unit 13 detects whether the intensity information is received. When the intensity information is received, the cursor unit 13 further calculates a size of a cursor C (see FIGS. 5-7) based on the intensity information and a predetermined relationship between the intensity information and the size of the cursor C, and generates the cursor C in the calculated size.

The control unit 14 controls the cursor C to be displayed on the calculated position on the screen 15. The control unit 14 further determines whether the intensity information matches predetermined information, or determines whether the calculated size of the cursor C matches a predetermined size. When the intensity information matches the predetermined information, or the calculated size of the cursor C matches the predetermined size, the control unit 14 further determines whether the screen 15 displays an icon on the calculated position. When the screen 15 displays an icon on the calculated position, the control unit 14 further activates the icon to call the associated function. In this embodiment, the predetermine intensity information is the intensity information generated when a touch on the touch unit 21.

Figure 3:
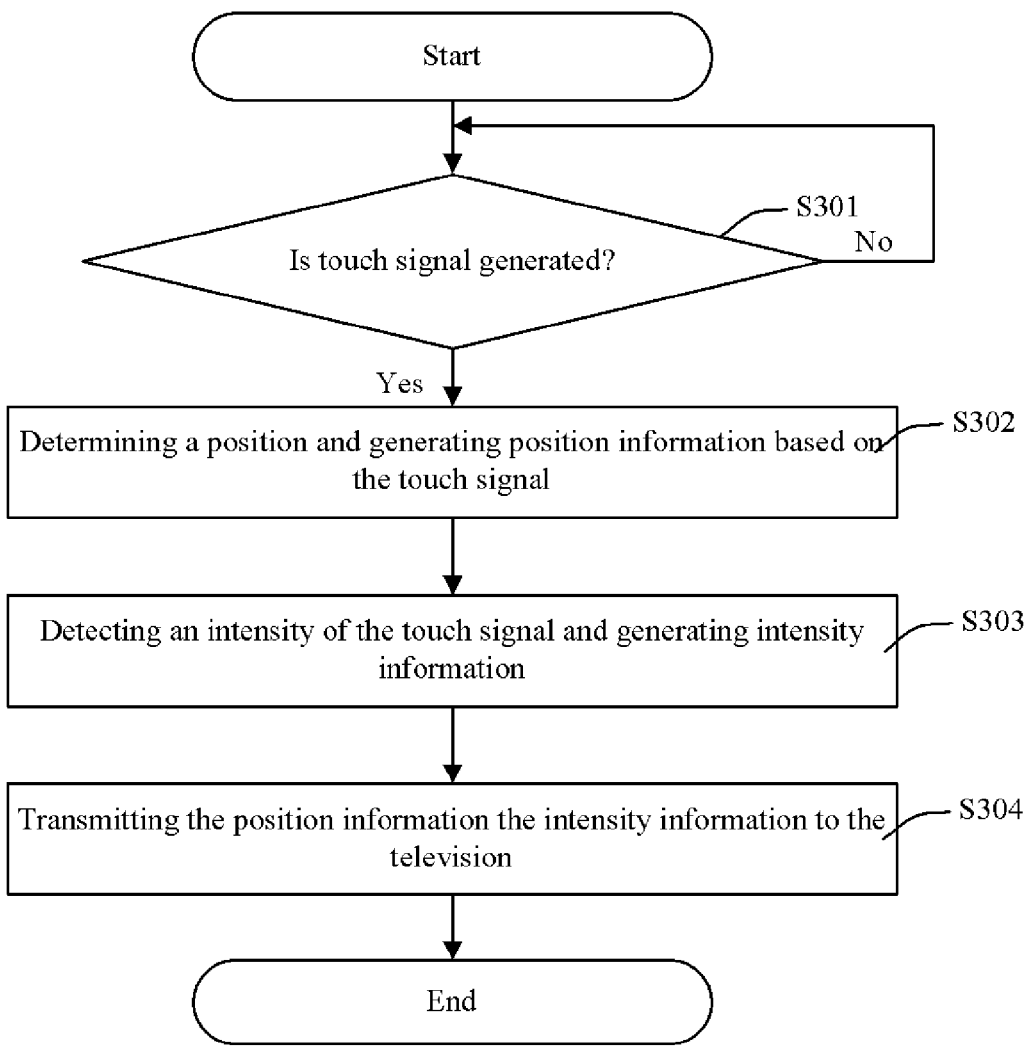
FIGS. 3-4 show a flowchart of a control method in accordance with an embodiment.

FIG. 3 shows a flowchart of a control method applied to the control device 10 for controlling the control device 10 to generate and transmit information to the television 20 to control the television 20 to carry out corresponding functions.

In step S301, the detecting unit 22 detects whether the touching unit 21 generates a touch signal. When the touching unit 21 generates the touch signal, the process goes step S302, otherwise the step S301 is repeated.

In step S302, the position determining unit 23 determines a position on the touch unit 21 to generate position information based on the touch signal.

In step S303, the detecting unit 22 detects intensity of the touch signal to generate intensity information.

In step S304, the transmitter 24 transmits the position information and the intensity information to the television 10.

Figure 4:
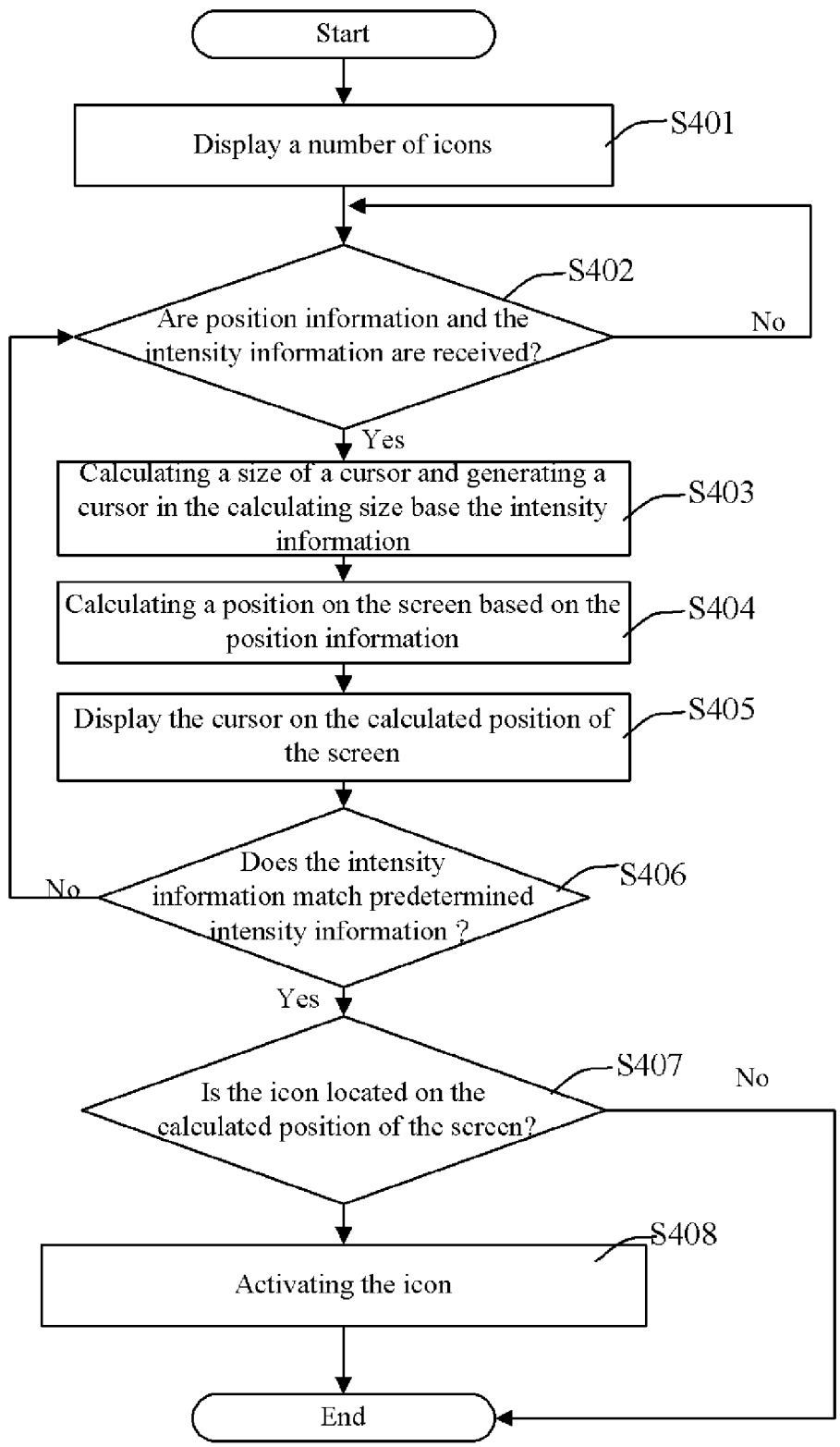

FIG. 4 show a flowchart of a control method applied to the television 20 for controlling the television 20 to carry out the corresponding functions based on the information from the control device 10.

In step S401, the screen unit 15 displays a number of icons to be activated.

In step S402, the position calculating unit 12 and the cursor unit 13 determine whether the position information and the intensity information are received. When the position information and the intensity information are received, the process goes to step S403, otherwise, step S402 is repeated.

In step S403, the cursor unit 13 calculates a size of a cursor C to generate the cursor C in the calculated size.

In step S404, the position calculating unit 12 calculates a position on the screen based on the position information and a predetermined position relationship between the screen 15 and the touch unit 21.

In step S405, the control unit 14 controls the screen 15 to display the cursor on the calculated position.

In step S406, the control unit 14 determines whether the intensity information matches predetermined intensity information. When the intensity information matches the predetermined intensity information, the process goes to step S407, otherwise, the process goes to step S402.

In step S407, the control unit 14 determines whether the screen 15 displays an icon on the calculated position. If screen 15 displays the icon, the process goes to step S408, otherwise, the process ends.

In step S408, the icon is activated to call a function associated with the icon.

Figure 5:
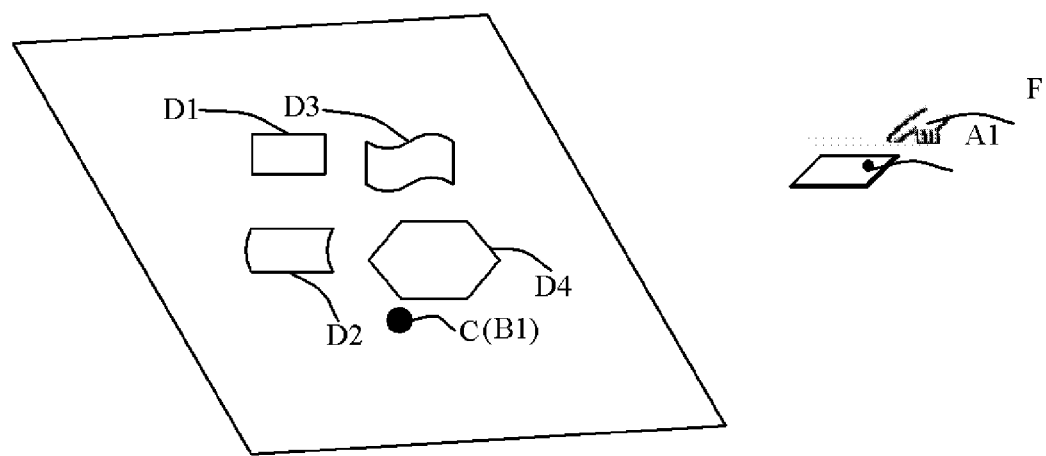
FIGS. 5-7 show an operation of the television system.
Figure 6:
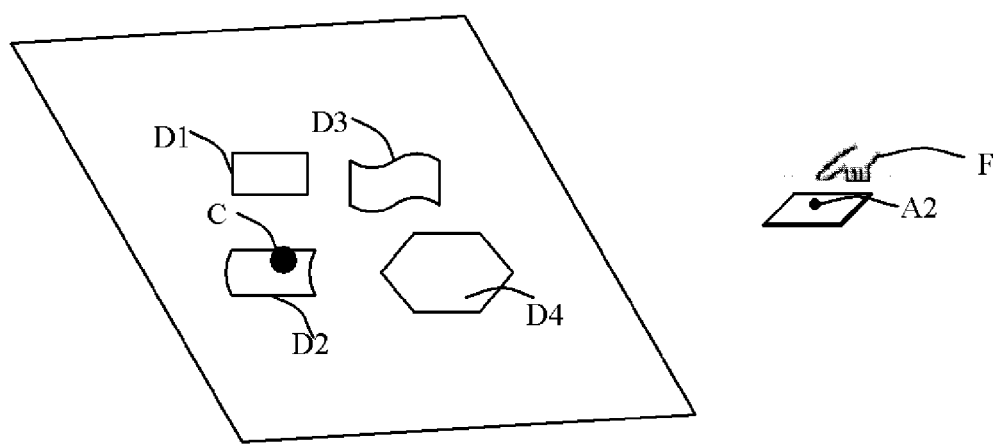
Figure 7:
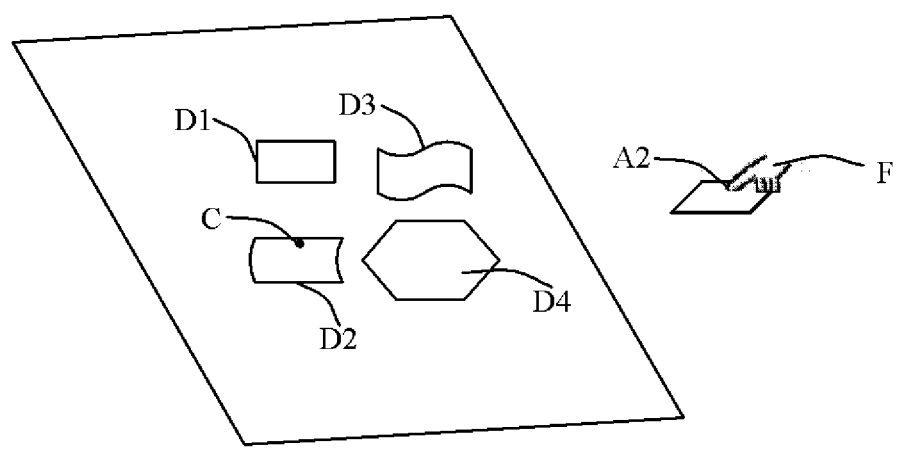

FIGS. 5-7 show that in operation, four icons D1-D4 are displayed on the screen 15 when the television 10 is started up. When a finger F of the user is pointed to a first position A1 and the distance between the finger F and the touch unit 21 is larger than 0 and shorter than the predetermined distance, the screen 15 display a cursor C in a first size on a second position B1 (see FIG. 5). When the user wants to activate the icon D2, first, the finger F is shifted left, the cursor C also shift left until the curse C moves to the icon D2, at this time, the finger points to the third position A2, and the distance between the finger F and the touch unit 21 is still shorter than the predetermined distance (see FIG. 6), the cursor C is still in the first size. Next, the finger F clicks on the third position A2, the size of the cursor C is changed to the predetermined size, and the icon D2 is activated to call the function associated with the icon D2.

As described above, the control method applied to the control device 20 and the television 10 controls the television 10 to activate one icon of the television by touching on the position of the touch unit 21 mapped to the position of the screen 15 where the icon is located. It is very convenient for the user to operate the television 20.

Even though relevant information and the advantages of the present embodiments have been set forth in the foregoing description, together with details of the functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A television manipulated by a control device having a touch unit, the control device generating position information mapped to a position on the control device and intensity information indicating a distance between an object and the touch unit, and transmitting the position information and the intensity information to the television, the television comprising:
   a screen displaying a plurality of icons associated with a plurality of functions, wherein positions on the screen are mapped to positions on the touch unit of the control device correspondingly;
   a receiver receiving the position information and the intensity information from the control device;
   a position calculating unit calculating a position on the screen according to the position information received from the control device;
   a cursor unit displaying a cursor on the screen and adjusting a size of the cursor according to the intensity information received from the control device; and
   a control unit controlling the cursor to move to the calculated position on the screen to point to an icon located at the calculated position, and activating the icon to call a function associated with the icon when the size of the cursor matches a predetermined size.

2. The television of claim 1, wherein the cursor unit calculates a size of the cursor according to the intensity information received from the control device, and generates the cursor having the calculated size, and displays the cursor on the calculated position on the screen.

3. The television of claim 1, wherein the unit is a capacitive touch screen or a capacity touch panel.

4. A control method for manipulating a television using a control device having a touch unit, the television comprising a screen to display a plurality of icons associated with a plurality of functions, wherein positions on the touch unit are mapped to positions on the screen correspondingly, the control method comprising:
   sensing, by the touch unit, an object pointed to the touch unit and generating position information according to a position on the touch unit pointed to by the object using the touch unit;
   generating, by the touch unit, intensity information indicating a distance between the object and the touch unit;
   receiving, by the television, the position information and the intensity information from the control device;
   calculating, by the television, a position on the screen according to the position information received from the control device; p1 displaying, by the television, a cursor at the calculated position on the screen to select the point to an icon located at the calculated position;
   adjusting, by the television, a size of the cursor according to the intensity information received from the control device; and
   activating, by the television, the icon to call a function associated with the icon when the size of the cursor matches a predetermined size.

5. The control method of claim 4, further comprising:
determining, by the touch unit, whether the object pointed to the touch unit is within a predetermined distance to the touch unit; and
determining, by the touch unit, the position on the touch unit pointed by the object and generating the position information when the object pointed to the touch unit is within the predetermined distance to the touch unit; and
transmitting, by the control device, the position information and the intensity information to the television.

6. The control method of claim 5, further comprising:
generating, by the touch unit, a touching signal when the object is within the predetermined distance to the touch unit, wherein the touch signal becomes stronger when the object is closer to the touch unit.

7. The control method of claim 4, wherein the touch unit is a capacitive touch screen or a capacity touch panel.

* * * * *